3,825,650
DECONTAMINATING URANIUM BY REACTION WITH ClF₃ AND HF AND VOLATIZING THE UF₆ PRODUCT
Robert A. Gustison, Knoxville, Harvey A. Bernhardt, Oak Ridge, Eugene J. Barber, Kingston, and Samuel T. Benton, Oak Ridge, Tenn., assignors to the United States of America as represented by the United States Atomic Energy Commission
No Drawing. Filed June 18, 1954, Ser. No. 437,903
Int. Cl. C22b 61/04; C01g 43/06
U.S. Cl. 423—19                                    6 Claims Our invention relates to a method of decontaminating uranium of extraneous impurities and more particularly to a method of decontaminating uranium contaminated with fission products and plutonium.

In utilizing uranium as a fuel in neutronic reactors, the uranium would ideally be left in the reactor until substantially all the uranium-235 had undergone fission. In practice, however, the uranium is withdrawn from the reactor for decontamination from fission products and plutonium long before all the uranium-235 has been consumed by fission. For example, uranium having the natural isotopic concentration may be withdrawn from a reactor after the concentration of the 235 isotope has been reduced from an initial 0.71% to only approximately 0.64%. This is done to prevent the accumulation of excessive quantities of fission products having large neutron absorption cross-sections. An extremely small amount of such fission products has a highly deleterious effect on the reactivity of a reactor and may even threaten the continuance of the chain reaction. Furthermore, when a reactor is employed to produce plutonium as a primary product, the plutonium must be removed before it is permitted to concentrate to a point at which it undergoes fission at an uneconomically rapid rate relative to the production thereof, with a resulting decrease in yield.

Since the uranium-235 remaining in a used uranium reactor fuel constitutes a significant and valuable quantity of fissionable material that may be re-used directly as a reactor fuel, reactor design permitting, or further concentrated by such isotope separation means as gaseous diffusion, the economical recovery and decontamination of such fuel is of supreme importance to the development of an atomic energy program.

The processing of uranium reactor fuels differs from most chemical processing principally in that minor quantities of fission products must be separated from large quantities of substantially unchanged material. The chemical processing associated with the operation of nuclear reactors employing uranium fuel, therefore, generally has three primary objectives: the removal of fission product poisons from the remaining fuel element; the reclamation of the fuel; and the recovery of plutonium when desired.

Among processes which have been considered for the decontamination of neutron irradiated uranium is a fluorination process wherein uranium is converted directly to UF₆ prior to separation from fission products and plutonium. Co-pending application S.N. 356,297 (48), entitled "Improved Fluorination Process," filed May 20, 1953 in the name of Thomas S. McMillan, teaches that uranium may be fluorinated at a satisfactory rate directly to UF₆ with a liquid mixture consisting of chlorine trifluoride together with a hydrogen fluoride catalyst at relatively low temperatures. We find, however, that the employment of the optimum ClF₃-HF mole ratio of approximately 0.3 (and other mole ratios from approximately 0.1–2.0), while achieving a rapid dissolution of uranium, creates considerable difficulty in any subsequent steps for the separation and decontamination of UF₆ by distillation due to the formation of a number of UF₆-containing azeotropes. Thus, large amounts of a binary UF₆-HF azeotrope, containing approximately 10 mole percent UF₆ are formed, as well as a relatively lower boiling binary ClF₃-HF azeotrope containing approximately 2 moles ClF₃ to one mole HF, and perhaps a ternary ClF₃-HF-UF₆ azeotrope containing small amounts of UF₆. Although the composition of the chlorine trifluoride-hydrogen fluoride binary azeotrope may deviate somewhat from exactly a two to one mole ratio, especially under different pressure conditions, this azeotrope will, for convenience, be designated herein as HF·2ClF₃.

From the foregoing it may be seen that the UF₆-HF azeotrope problem could be avoided by maintaining sufficient ClF₃ in the reaction mixture to bind the HF in the competing, lower boiling ClF₃-HF azeotrope in preference to UF₆. A ClF₃-HF mole ratio of at least approximately 2.0 would be sufficiently high for such purposes. However, raising the ClF₃-HF mole ratio unfortunately slows the rate of uranium dissolution. Therefore, providing the azeotrope problems could be surmounted, it would be desirable to continue the employment of the optimum ClF₃-HF mole ratio.

With a knowledge of these difficulties, an object of our invention is to provide a fluorination process for the recovery and decontamination of uranium values from extraneous impurities.

Another object is to provide a fluorination process for the recovery and decontamination of uranium contaminated with fission products and plutonium.

Another object is to provide a flurination process for the recovery and decontamination of uranium contaminated with fission products and plutonium in a form suitable for direct introduction into a gaseous diffusion cascade.

An additional object is to provide a fluorination process for the recovery and decontamination of uranium contaminated with fission products and plutonium which surmounts azeotrope problems resulting from the employment of a ClF₃-HF fluorination solution in a mole ratio of approximately 0.1–2.0.

Yet another object is to provide a fluorination process for the recovery and decontamination of uranium contaminated with fission products and plutonium in which the fluorination reagent is recovered for the further dissolution of uranium.

A further object is to provide a fluorination process for the recovery and decontamination of uranium contaminated with fission products and plutonium in which the active fluorination reagent is continuously regenerated.

Other objects and advantages of our invention will become apparent from the following detailed description and the claims appended hereto.

In accordance with our invention, uranium values may be recovered and decontaminated from extraneous impurities by dissolving said uranium in a reaction zone with a liquid fluorination solution comprising chlorine trifluoride and hydrogen fluoride maintained at a ClF₃-HF mole ratio of approximately 0.1–2.0 together with at least approximately 0.1 mole UF₆ per mole HF in excess of the HF requirements of the HF·2ClF₃ azeotrope, fractionally distilling the resulting reaction mixture, separately collecting the resulting UF₆ product and the fraction of said reaction mixture relatively lower boiling than said UF₆, and returning said low boiling fraction to said reaction zone for the further dissolution of uranium. The low boiling fraction comprises essentially the HF·2ClF₃ and UF₆-HF azeotropes and any ClF₃-HF-UF₆ azeotrope, or in other words, is essentially of the same composition as the initial fluorination solution, less the reacted ClF₃, while the fraction relatively less volatile than the UF₆ product comprises plutonium and virtually all the fission products, when such are the contaminants of the uranium.

In this specification the term "uranium values" is intended to embrace uranium metal and uranium compounds, particularly the oxides, fluorides and oxyfluorides. While our invention may be beneficially applied to the recovery of uranium values from any manner of extraneous impurity, for clarity in presentation our invention will hereinafter be illustrated specifically with respect to neutron irradiated uranium, for which it is particularly suitably adapted.

The practice of our invention results in an eminently successful solution to the $UF_6$-containing azeotropes problem. Thus, we find that these azeotropes may be distilled in the low boiling fraction together with the $HF \cdot 2ClF_3$ azeotrope and that the resulting mixture is unexpectedly satisfactory for repeated re-use in the dissolution of additional uranium and therefore a minimum constant holdup of $UF_6$ is obtained. Additionally, employing our invention, we have consistently recovered highly decontaminated $UF_6$ from neutron irradiated normal uranium that has met or exceeded the desired purity specifications for $UF_6$ feed for a gaseous diffusion cascade. For this purpose, it is desirable that such $UF_6$ have less than 10 parts per billion of plutonium and radioactivity no higher than that of natural uranium. By the elimination of unstable daughter decay products the process of our invention can produce $UF_6$ having less than 100% of the equilibrium gamma activity and 10% or less of the equilibrium beta activity of normal $UF_6$.

The $UF_6$ requirements of the $$HF\text{-}UF_6 \text{ and } ClF_3\text{-}HF\text{-}UF_6$$

azeotropes may be satisfied without the initial provision of $UF_6$ in the fluorination solution by successive re-use of the low boiling fraction. Alternatively, the azeotropic requirements may be met by the initial provision of sufficient $UF_6$ in the fluorination solution. In either event, when employing $ClF_3$-HF in a mole ratio of approximately 0.1–2.0, at least approximately 0.1 mole $UF_6$ per mole HF in excess of the HF requirements of the $HF \cdot 2ClF_3$ azeotrope should be provided. The reason for this may be appreciated when it is noted that the $HF \cdot 2ClF_3$ azeotrope comprises approximately 2 moles $ClF_3$ to one mole HF, and that any excess HF will form the relatively higher boiling $HF\text{-}UF_6$ azeotrope which contains approximately 0.1 mole $UF_6$ per mole HF. However, to provide for the presence of any ternary $$ClF_3\text{-}HF\text{-}UF_6$$

azeotrope or any $UF_6$ losses or holdup during processing, we prefer to employ approximately 0.2 mole $UF_6$ per mole of excess HF. A preferred fluorination solution may comprise, then, approximately 20.5 mole percent $ClF_3$, approximately 68 mole percent HF (mole ratio 0.3), and approximately 11.5 mole percent $UF_6$ (0.2 mole $UF_6$ per mole HF in excess of $HF \cdot ClF_3$ requirements).

The rate of dissolution of metallic uranium with a given $ClF_3$-HF mole ratio is a direct function of temperature. For example, it will take a $ClF_3$-HF solution, 0.3 mole ratio, approximately 590 hours to dissolve a given uranium metal mass at 10° C., while it will take only approximately 19 hours at 80° C. We, therefore, prefer to employ as high a temperature as is compatible with the strength of the apparatus employed, recognizing that $ClF_3$ is highly hazardous and corrosive and explodes on contact with many ordinary materials. We find that a temperature of at least approximately 30° C. gives a satisfactory rate of dissolution while we prefer to employ a temperature of approximately 80° C.

It should be noted that since the fluorination solution is relatively low boiling (b.p. $ClF_3$, 11° C.; b.p. HF, 19° C.) it is desirable to conduct the dissolution under pressure to prevent violent refluxing. The required pressure will, of course, vary directly with temperature. For example, at a temperature of 30° C., a pressure of approximately 25 p.s.i.g. may be employed while at 80° C., a pressure of approximately 125 p.s.i.g. is suitable. An inert atmosphere, such as helium, may be employed for such confining purposes but fluorine is preferred for it may be further utilized for regenerating ClF as described below In accordance with our invention, the requirements of $ClF_3$, the active fluorination reagent, may be met by initially providing a stoichiometric excess of $ClF_3$ in the reaction mixture or by adding $ClF_3$ as required. However, we unexpectedly find that the continuous regeneration of $ClF_3$ during the course of the dissolution by contacting the gaseous ClF reaction product (b.p.—100° C.) with fluorine has a number of extremely significant benefits. Thus, the only reagent consumed is fluorine, which is relatively less expensive than chlorine trifluoride, the rate of uranium dissolution may be accurately followed by monitoring the fluorine consumption, and relatively less HF catalyst need be employed to meet a desired $ClF_3$-HF mole ratio, since less than stoichiometric requirements of $ClF_3$ may be initially utilized. Furthermore, regeneration of $ClF_3$ in turn permits repeated use of the low boiling fraction, which contains the various azeotropes, for the further dissolution of uranium substantially without $ClF_3$-HF remakeup. Hence, it may be readily appreciated that the separate parts of our invention, viz, the $ClF_3$ regeneration, the re-use of the fluorination solution, and the minimization of the azeotrope problems, are highly interrelated.

Since the reaction mixture is ordinarily maintained at a temperature below that which is required for the regeneration of $ClF_3$, the regeneration may either be affected in a different part of the same system or the ClF product may be withdrawn for regeneration. In the former method, which we prefer, the regeneration may be conveniently achieved, when employing fluorine as the confining gas, by continuously circulating ClF together with fluorine through a reaction zone maintained at a temperature of approximately 250°–350° C. Furthermore, the rate of regeneration may be accelerated by the employment of a suitable catalyst, such as, for example, nickel, copper or silver. Preferably, the regeneration is conducted at a temperature of approximately 300° C. over copper.

When the dissolution is completed, as is indicated by the cessation of fluorine consumption, the resulting reaction mixture consists of $ClF_3$-HF, which may be essentially unchanged in mole ratio as a result of $ClF_3$ regeneration, together with the $UF_6$-HF azeotrope, the $UF_6$ product, various fission product fluorides and relatively non-volatile plutonium fluorides. We unexpectedly find that the significant differences in the vapor pressures of the reaction mixture constituents permits a very satisfactory recovery of $UF_6$. Thus, the $ClF_3$-HF fluorination solution and the $UF_6$-HF and $ClF_3$-HF-$UF_6$ azeotropes boil at a temperature below approximately 25° C., while $UF_6$ boils at approximately 56.2° C., and plutonium trifluoride and the preponderant majority of the fission product fluorides are virtually non-volatile.

In view of the foregoing it may be readily seen that the distillation may satisfactorily be conducted by a variety of methods, and therefore the extact method selected does not appear to be critical. For example, the distillation may be conducted directly from the reaction vessel, employing the reaction vessel as a still pot. In this method the relatively volatile fluorination solution and the azeotropes may be distilled first, followed by the $UF_6$ product, leaving a residue of fission product fluorides and plutonium trifluoride. In another method, which we prefer to employ, the fluorination solution and the $UF_6$ product may be transferred together, in the vapor phase, to a conventional fractional distillation apparatus, leaving behind the plutonium and over approximately 99% of the fission products. While any temperature above the boiling point of $UF_6$ may be employed for the vapor transfer of the fluorination solution and the $UF_6$, we prefer to utilize one which achieves a relatively low vapor velocity to minimize the possibility of physical entrainment of fission products which might occur with a more vigorous vaporization. This desideratum may be achieved, for example, at a temperature of approximately 60° C. A principal advantage of transferring the fluorination solution and the $UF_6$ away from the reaction mixture, before their individual separation is that a great reduction in radioactivity is thereby achieved which permits the subsequent distillation to be conducted with very little or no radiation shielding and remote control handling equipment.

The fractional distillation of the azeotropes-containing fluorination solution and the $UF_6$ product may be easily accomplished in view of the considerable differences in the respective vapor pressures and the exact distillation temperature therefore is not critical. However, it is desirable to maintain $UF_6$ as a liquid during the distillation, and since $UF_6$ sublimes at a lower temperature (56.2° C.) than its triple point (64.052° C. at 1,134 mm. Hg), it is necessary to apply a pressure of at least approximately 9 p.s.i.g. (pounds square inch gauge) in order to maintain $UF_6$ as a liquid. While in a batch distillation the low boiling fraction may be collected at head temperatures below the triple point, prior to increasing the temperature for the subsequent $UF_6$ recovery, operational difficulties may be created by such a technique due to $UF_6$ solidification. Therefore, we find a head temperature of at least approximately 64° C. and a pressure of at least approximately 9 p.s.i.g. to be satisfactory while a head temperature of approximatley 66° C. and an initial pressure of approximately 90 p.s.i.g. gives an exceedingly clean separation. After removal of lower boiling components, a pressure drop may be expected.

Any plutonium remaining in the original reaction mixture residue after the removal of the dissolver solution and the $UF_6$ for distillation may be recovered by dissolving the residue in a 5% aluminum nitrate solution acidified to approximately pH 0.5 with nitric acid or with a 1% solution of "Versene" (disodium salt of ethylenediamine tetraacetic acid) at approximately pH 7-9, and subjecting the resulting solution to a solvent extraction process such as is taught in co-pending application S.N. 303,691, filed Aug. 11, 1952 in the names of Thomas C. Runion, William B. Lanham, Jr., and Charles V. Ellison.

Numerous satisfactory conventional systems are available for use with our invention, and the employment of a particular system is not critical. One such system may comprise, briefly, a monel reactor provided with a reflux condenser which functions to dissipate the heat of reaction and confine the volatile fission products. A magnetic pump may be positioned above the condenser to pass the fluorine and ClF through a regeneration tube packed with copper turnings and provided with a return line to the reactor for the resulting regenerated $ClF_3$. The reactor may be connected with a fluorination solution reservoir solution reservoir and with a novel still pot of a conventional packed distillation column. The column may have a product withdrawal line provided with a valve to regulate take off and a filter for the removal of entrained materials. Finally, transfer lines may connect the distillation column with the reservoir, to preserve the low boiling fraction until required for the dissolution of additional uranium.

In a preferred form of our invention, a neutron-irradiated uranium mass is dissolved in a fluorination solution comprising approximately 68 mole percent HF (mole ratio 0.3) and approximately 11.5 mole percent $UF_6$ (0.2 mole $UF_6$ per mole HF in excess of $HF \cdot 2ClF_3$ requirements) and maintained at a temperature of approximately 80° C. under a fluorine atmosphere. During the course of the dissolution the ClF reaction product is circulated together with fluorine over a copper catalyst in a separate reaction zone maintained at a temperature of approximately 300° C., and the resulting regenerated $ClF_3$ is returned to the reaction mixture. Upon conclusion of dissolution, the reaction mixture is cooled to approximately −30° C., and the residual fluorine evacuated from the system. After the evacuation of the fluorine, the reaction mixture is heated to approximately 60° C., to affect a vapor transfer of the dissolver solution and the $UF_6$ reaction product to a distillation apparatus and away from the preponderant majority of the fission products and plutonium. The resulting solution is distilled at a head temperature of approximately 66° C. and at a pressure of approximately 90 p.s.i.g. and the low boiling fluorination solution and the $UF_6$ product are thereby clearly separated. The recovered flourination solution may be used for the dissolution of additional uranium.

The following examples are offered to illustrate our invention in greater detail.

EXAMPLE 1

The previously referred to system was employed.

A mass of approximately 2500 grams of normal uranium which had been subjected to nuclear irradiation in a nuclear reactor and had been subsequently "cooled" (i.e., stored), for 93 days was cut into slices varying between ⅛ and ½ inch and charged into the reactor. Prior to processing, the radioactivity and the plutonium content of the uranium were determined to be as follows: Pu content, 545 p.p.m., gamma activity 56,500 millivolts/min./mg. (based on 0.035 millivolts/min./mg. for nomal U); and beta activity, $450 \times 10^6$ cats./min./mg. (based on 1502 cts./min./mg. for normal U).

A fluorination solution comprising 4000 grams of $ClF_3$ and 500 grams of HF (a $ClF_3$-HF mole ratio of approximately 1.7) was then added to the reactor. The reactor and condenser were maintained throughout the run at temperatures of 30° C., and 0° C., respectively, and the pressure in the system was maintained at approximately 30-50 p.s.i.g. by the admission of gaseous flourine as required.

During fluorination the magnetic pump was operated continuously to circulate ClF and fluorine through the regeneration tube which was maintained at approximately 300° C. and the resulting regenerated $ClF_3$ was returned to the reactor. The rate of fluorination of the uranium was followed by observing the rate of fluorine consumption and the run was terminated after consumption of fluorine had ceased, the total time being about 70 hours.

The reactor was then cooled to approximately −30° C. and the residual fluorine evacuated. The reactor and condenser were heated to approximately 60° C. to affect a vapor transfer of the fluorination solution and the $UF_6$ to the still pot of the distillation column. Virtually all of the plutonium and more than 99% of the fission products were left in the reactor by the vapor transfer. This residue was dissolved with a 5% aluminum nitrate solution acidified to approximately pH 0.5 with nitric acid and transferred to a storage tank for subsequent recovery of Pu by solvent extraction.

The distillation column was operated at a head temperature of approximately 66° C., a still pot temperature of approximately 125° C., and an initial pressure of approximately 90 p.s.i.g. The low boiling components were taken off at a reflux ratio of 13.7, and returned to the reservoir for the next run. The low boiling fraction consisted of 4000 grams $ClF_3$, 500 grams HF and 130 grams $UF_6$. After the last of the low boiling fraction was taken off at a pressure of approximately 70 p.s.i.g., a sharp drop in pressure occurred. The column was then flooded with $UF_6$ to hasten equilibrium, and continuous take off of $UF_6$ at a rate of 200 cc. per hour was maintained until the still pot went dry. The $UF_6$ remaining in the heel fraction, approximately 600 grams, was retained in the pot for recycle to the next run. Approximately 2850 grams of $UF_6$ product was obtained.

Analysis of the $UF_6$ product showed a plutonium content of only 5 parts per billion, a beta activity equivalent to but 1.5% of normal uranium, and a gamma activity equal to 96% of normal uranium. Thus, the purity requirements for such $UF_6$ feed for a gaseous diffusion cascade were exceeded.

EXAMPLE II

Same as Example I, except as indicated.

The florination solution consisted of 334 grams $ClF_3$, 258 grams HF (a $ClF_3$-HF mole ratio of approximately 0.3) and 700 grams $UF_6$, approximately 54% $UF_6$ by weight). The uranium reactor charge was 1365 grams. Upon dissolution of the uranium, the fluorination solution and the product were transferred to the fractionation column and distilled at a head temperature of 66° C., a reflux ratio of four to one, and a throughput of about 200 cc./hr. The $UF_6$ product consisted of 2065 grams, the $UF_6$ waste of 21 grams, and the low boiling fraction returned for recycle was of the exact composition of the original fluorination solution, viz, 334 grams $ClF_3$, 258 grams HF, and 700 grams $UF_6$. The product fully met the extremely high purity specifications for such $UF_6$ feed for a gaseous diffusion cascade.

It should be understood that the above examples are merely illustrative and that those skilled in the art may make modifications in our invention, particularly in its distillation features, without departing from its spirit. Therefore, our invention should be limited only as is indicated by the appended claims.

Having thus described our invention, we claim as novel the following:

1. A fluorination process for the recovery and decontamination of uranium values from extraneous impurities which comprises dissolving said uranium in a reaction zone with a liquid fluorination solution comprising chlorine trifluoride and hydrogen fluoride maintained at a $ClF_3$-HF mole ratio of approximately 0.1–2.0 and at least approximately 0.1 mole $UF_6$ mole HF in excess of the HF requirements of the $HF \cdot 2ClF_3$ azeotrope, fractionally distilling the resulting reaction mixture and separately recovering the resulting $UF_6$ product and the fraction of said reaction mixture relatively lower boiling than said $UF_6$ and returning said low boiling fraction to said reaction zone for the further dissolution of uranium.

2. A fluorination process for the recovery and decontamination of uranium values from extraneous impurities which comprises dissolving said uranium in a reaction zone with a liquid fluorination solution comprising chlorine trifluoride and hydrogen fluoride maintained at a $ClF_3$-HF mole ratio of approximately 0.1–2.0 and at least approximately 0.1 mole $UF_6$ per mole HF in excess of the HF requirements of the $HF \cdot 2ClF_3$ azeotrope, continuously contacting the resulting chlorine monofluoride with fluorine and returning the resulting regenerated chlorine trifluoride to said liquid mixture until the dissolution of said uranium is completed, fractionally distilling the resulting reaction mixture and separately recovering the resulting $UF_6$ product and the fraction of said reaction mixture relatively lower boiling than said $UF_6$ and returning said low boiling fraction to said reaction zone for the further dissolution of uranium.

3. The process of claim 2 wherein the regeneration of chlorine trifluoride is conducted at a temperature of approximately 250° C. to approximately 250° C. over a catalyst selected from the group consisting of copper, silver and nickel.

4. A fluorination process for the recovery and decontamination of uranium contaminated with fission products and plutonium which comprises dissolving said uranium in a reaction zone with a liquid fluorination solution comprising chlorine trifluoride and hydrogen fluoride maintained at a mole ratio of approximately 0.1–2.0 and at least approximately 0.1 mole $UF_6$ per mole of HF in excess of the HF requirements of the $HF \cdot 2ClF_3$ azeotrope, fractionally distilling the resulting reaction mixture and separately recovering the resulting $UF_6$ product and the fraction of said reaction mixture relatively lower boiling than said $UF_6$ and returning low boiling fraction to said reaction zone for the further dissolution of uranium.

5. A fluorination process for the recovery and decontamination of uranium contaminated with fission products and plutonium which comprises dissolving said uranium in a reaction zone with a liquid fluorination solution comprising chlorine trifluoride and hydrogen fluoride maintained at a $ClF_3$-HF mole ratio of approximately 0.3 and approximately 0.2 mole $UF_6$ per mole of HF in excess of the HF requirements of the $HF \cdot 2ClF_3$ azeotrope, continuously contacting the resulting chlorine monofluoride with fluorine at a temperature of approximately 250° C.– 350° C. over a catalyst selected from the group consisting of copper, silver and nickel and returning the resulting regenerated chlorine trifluoride to said liquid mixture until the dissolution of said uranium is completed, volatilizing the resulting $UF_6$ product and the fraction of the resulting reaction mixture relatively lower boiling than sa'd $UF_6$ away from the remaining relatively non-volatile reaction mixture, fractionally distilling the resulting distillate, and separately collecting said $UF_6$ product and returning said low boiling fraction to said reaction zone for the further dissolution of uranium.

6. The process of claim 5 wherein the uranium dissolution is conducted at a temperature of at least approximately 30° C. and at a pressure of at least approximately 25 p.s.i.g., and the distillation at a head temperature of at least approximately 64° C. and at a pressure of at least approximately 9 p.s.i.g.

No references cited.

CARL D. QUARFORTH, Primary Examiner

E. A. MILLER, Assistant Examiner

U.S. Cl. X.R.

423—258

UNITED STATES PATENT OFFICE
CERTIFICATE OF CORRECTION

Patent No. 3,825,650          Dated July 23, 1974

Inventor(s) Robert A. Gustison et al.

It is certified that error appears in the above-identified patent and that said Letters Patent are hereby corrected as shown below:

Column 2, line 30, "flurination" should read --fluorination--.
Column 4, line 61, "extact" should read --exact--.
Column 5, line 30, "proximattely" should read --proximately--; lines 55 and 56, "solution reservoir", second occurrence, should be deleted; also on line 56, "novel" should read --monel--.
Column 6, line 27, "cats." should read --cts.--.
Column 7, line 34, after "UF$_6$" should read --per--.
Column 8, line 5, "250°C", second occurrence, should read --350°C--.

Signed and sealed this 7th day of January 1975.

(SEAL)
Attest:

McCOY M. GIBSON JR.          C. MARSHALL DANN
Attesting Officer          Commissioner of Patents